United States Patent [19]

Pagani

[11] 3,961,658
[45] June 8, 1976

[54] SEA WATER DESALINATION APPARATUS
[75] Inventor: Giorgio Pagani, Milan, Italy
[73] Assignee: Snam Progetti S.p.A., Milan, Italy
[22] Filed: Aug. 8, 1975
[21] Appl. No.: 603,186

Related U.S. Application Data
[63] Continuation of Ser. No. 376,949, July 6, 1973, abandoned.

[30] Foreign Application Priority Data
July 7, 1972 Italy.................................. 26732/72

[52] U.S. Cl. ............................. 159/13 A; 159/17 C; 159/18; 202/174
[51] Int. Cl.² ...................... B01D 1/22; B01D 1/26; B01D 3/02
[58] Field of Search ................. 159/17 C, 17 R, 18, 159/DIG. 8, 46; 202/174

[56] References Cited
UNITED STATES PATENTS

| | | |
|---|---|---|
| 3,304,242 | 2/1967 | Lockman .......................... 159/18 X |
| 3,344,041 | 9/1967 | Wulfson .............................. 159/18 |
| 3,481,835 | 12/1969 | Carnavos .......................... 159/17 P |
| 3,820,581 | 6/1974 | Machida et al. ...................... 159/18 |
| 3,824,154 | 7/1974 | Takada et al. ........................ 159/18 |
| 3,824,155 | 7/1974 | Takada ................................ 159/18 |

Primary Examiner—Jack Sofer
Attorney, Agent, or Firm—Ralph M. Watson

[57] ABSTRACT

A novel apparatus for the desalination of sea water is described. The apparatus comprises a column of a plurality of superposed cylindrical sections, each section including two film evaporators; two basins interconnected between said cylindrical sections; a restriction for passing brine from basin to basin, siphon tubes for withdrawing the condensed water from each section and accessory preheating means and inlet and outlet tubes.

4 Claims, 5 Drawing Figures

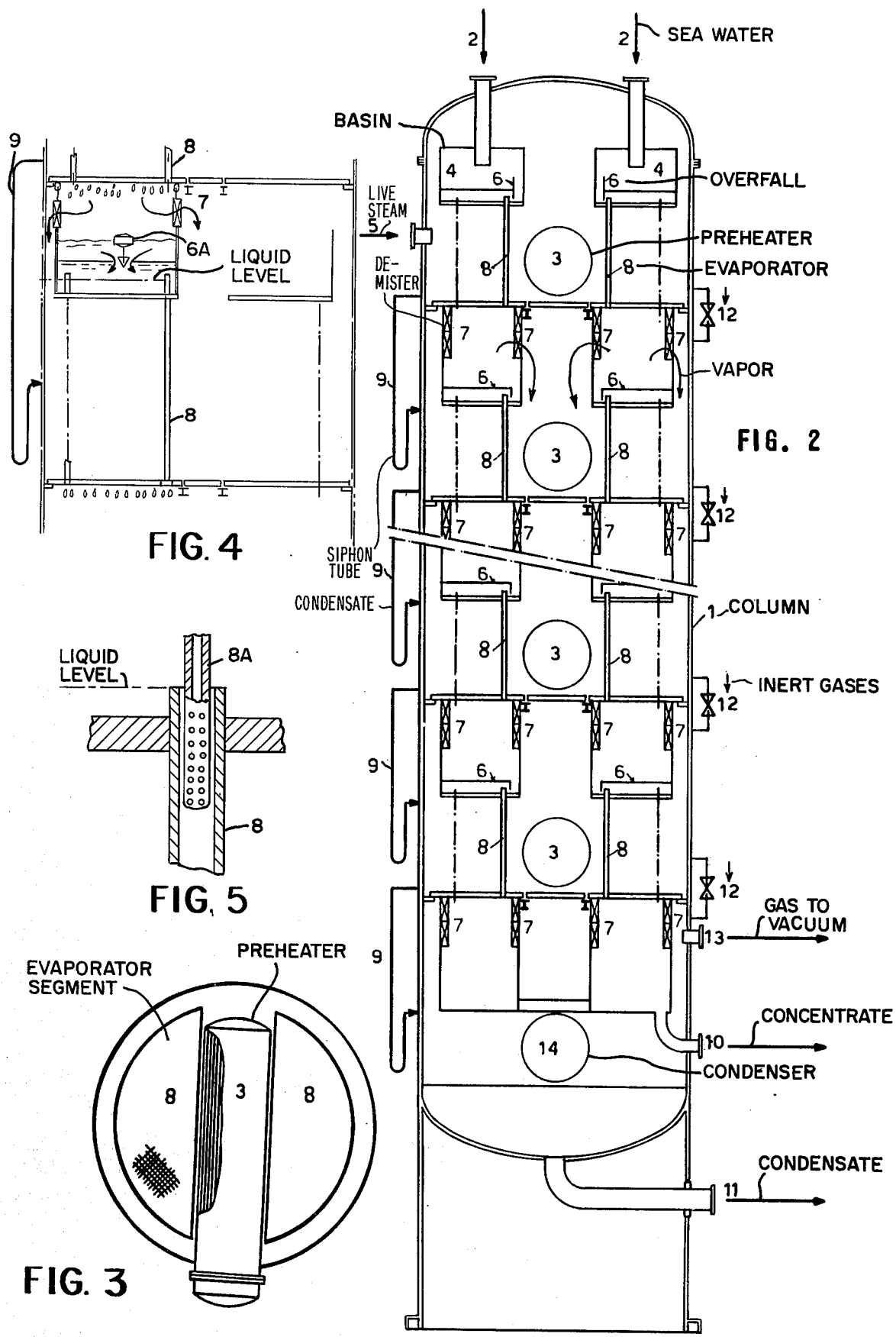

3,961,658

SEA WATER DESALINATION APPARATUS

This application is a continuation of Ser. No. 376,949 filed July 6, 1973, now abandoned.

This invention relates to an apparatus for the desalination of sea water. The desalination of sea water can be effected by means of heat according to the following processes:
— "multiflash" process
— multiple-effect process.

The multiflash process is based essentially on the multistage evaporation of a salt water stream at gradually decreasing pressures in a range of temperatures usually comprised between 130°C. and 20°C.

The vapors developed in each single flash stage are condensed on a surface cooled by the stream of cold salt water and constitute the output of fresh water.

The salt water is heated further before going to the flash zone, generally with low pressure vapor.

The multiple-effect distillation process is based, on the contrary, on the well known principle of evaporation and succeeding condensation: the vapor produced in one stage is permitted to condense in the following stage for producing vapor at a lower thermal level and so on for all the other stages. The fundamental concept of evaporations and succeeding condensations being so, the processes of multiple-effect distillation can differ in the methods of preheating the feed and of recovering the heat contained in the effluents, that is:
— "forward feed" wherein the feed, conveniently preheated, stage by stage, with condensing vapor, is introduced into the stage having the highest temperature. The solution to be evaporated flows in the same direction as the condensing vapor;
— "backward feed", wherein the feed is introduced cold into the stage having the lowest temperature and by means of a pump it is sent to the following stages. The solution to be concentrated flows in the opposite direction to the condensing vapor, that is, to evaporate the solution in the first stage, the vapor coming from the preceding stage is used and so on except in the last stage wherein live steam is used.

In the 1960's the Office of Saline Water — USA studied a particular type of multiple-effect desalination plant, characterized by using vertical film evaporators (VTE: Vertical Tube Evaporators) fed with forward feed sequence or with mixed forward feed and backward feed sequences.

Reference is now to be had to the drawings wherein:

FIG. 2 is an enlarged presentment of a single evaporator in cross-section made in accordance with the present invention illustrating its operation.

FIG. 3 is an enlarged cross-section of a portion of the evaporator shown in FIG. 2 illustrating the relationship of the preheater and the evaporator.

FIG. 4 is a cross-section of another portion of the evaporator shown in FIG. 2 illustrating the fluid movement therethrough.

FIG. 5 is a fragmentary partial cutaway view of a portion of the view shown in FIG. 4.

Figure 1:
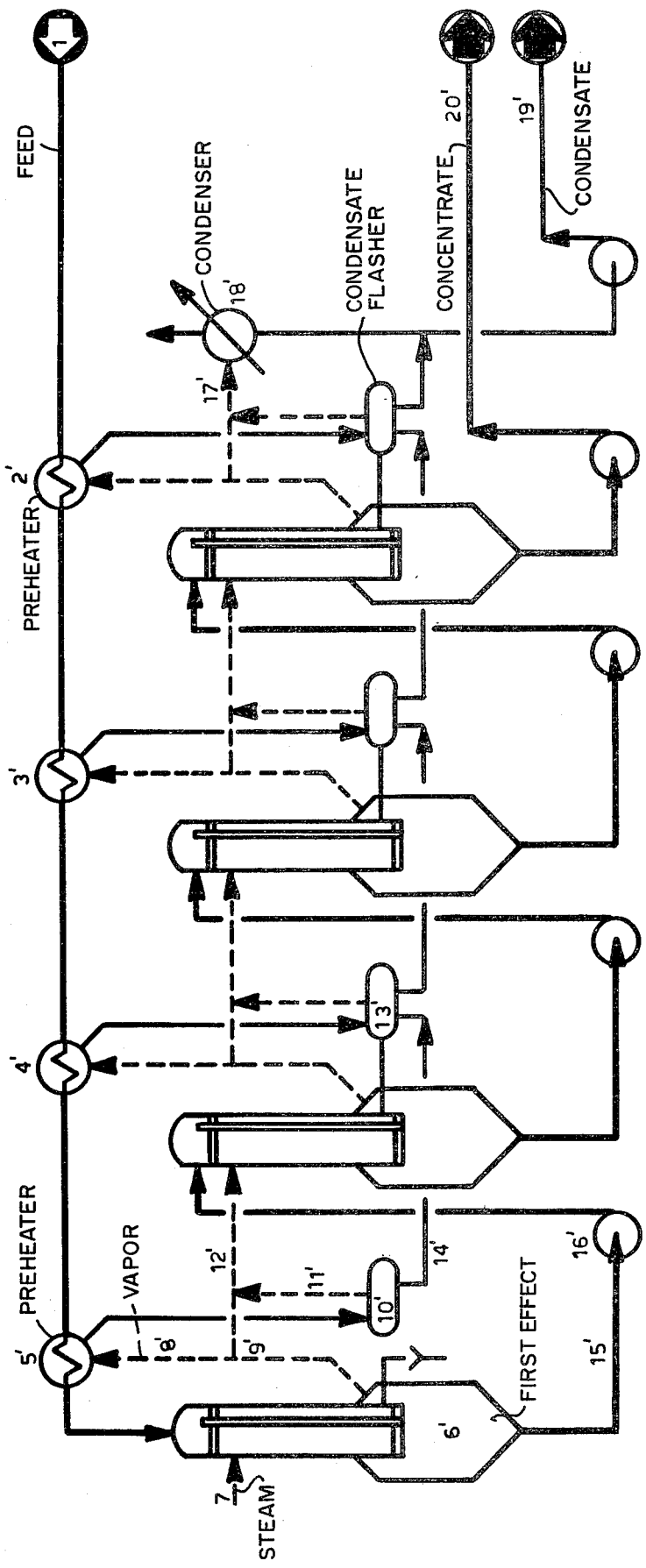
FIG. 1 is a schematic presentment of a prior art arrangement of a plurality of vertical tube evaporators.

In FIG. 1 the multiple-effect VTE Process illustrated is limited for simplicity to only four effects, fed with the forward feed sequence and wherein the evaporators are of the film type.

The sea water 1' is preheated, through the stages 2', 3', 4' and 5' with condensing vapor and enters into the first effect 6', where heat is supplied by means of steam coming from outside 7'; the steam produced in this way passes partly 9' to the succeeding effect and partly 8' to the corresponding condenser preheating the sea water. The condensate coming from the condenser 5' is permitted to expand into the tank 10'; from this tank two streams are coming out; a liquid stream which is introduced into the tank 13' through 14' and a steam stream 11' which joins the vapor stream 9' coming from the first effect. The joined vapor stream is indicated by 12'.

For the other effects the operations are the same. In the last stage the vapor stream 17' is joined to a vacuum system 18' for instance a barometric condenser, a liquid ring pump or a vacuum pump.

The brine comes out through 20' while the fresh water is discharged through 19'. The brine 15' is transferred from the first effect to the second one by means of a pump 16'.

The advantages of this process in comparison with the multiflash process are the following (please note that some of these advantages are typical of the multiple effect processes):
— the highest concentration of salt is only in the coldest part; this fact permits reaching a concentration factor of about 3 (approximately 100 g/liter of salt) without having scale, while in the multiflash process one cannot exceed a concentration factor of about 2. By concentration factor we mean the ratio between the final concentration and the initial one of the salt dissolved in water. As a consequence the flow rate of sea water feed decreases by about ⅓ in the multiple-effect process;
— the ratio of salt water to produced fresh water is 1:5 for the multiple effect, while it increases to 7:5 in the multiflash process, due to the recirculation of the most of the brine. Owing to the lower flat rate involved, the number of stages of a multiple effect process is about ⅓ of the stages of a multiflash process having the same heat consumption;
— minor hydraulic problems and minor energy consumption due to the lower involved flow rates of liquid;
— possibility of achieving higher heat exchange coefficients in the film evaporators in comparison with those obtained in the condensers of the multiflash process;
— higher temperature difference ($\Delta T$) utilizable for heat transfer, whether for the lower number of stages or for the constant temperature of the evaporating film which operates without head.

The drawbacks are essentially of an engineering type, connected to the plant development in a horizontal sense (necessity of pumps for transferring the salt water from one stage to the following one and the necessity for large pipes for the passage of steam).

Thus the plant is not competitive with the equivalent multiflash plant.

I have found an apparatus, which is the subject of the present invention, by which it is possible to carry out the multiple-effect distillation process of sea water, by keeping the advantages above described an by eliminating the main drawbacks due to the use of pumps among the different stages and to the use of large diameter pipe for transferring the vapor.

The apparatus consists of a column vertically arranged and divided in to several cylindrical sections.

Each section comprises the following elements:
1. 2 film evaporators with bundles of vertical tubes, having preferably a cross section shaped as a segment of a circle, without external shell.
2. 2 basins, each of which is connected:
   a. at the bottom, to the upper tube sheet of one of the film evaporators of the same section; in the last section, without film evaporators, said basins are connected to the discharge tube of the brine.
   b. on the top, to the lower tube sheet of one of the film evaporators of the overlying section; in the first section said basins are connected to the feed tubes of the sea water.
3. a restriction at the bottom of each basin and having the purpose of permitting the passage of the brine from the basin to the under lying tube sheet, by dissipating at the same time the positive pressure difference existing between the basin and the tube sheet.

In the FIG. 2, such a system is simply represented by a submerged overflow even though other systems can be used (valves, preferably float valves).

4. Openings made in the upper side of each basin, except in the basin of the first section on the top, said openings being supplied, where necessary, with liquid removers (demisters).
5. One or several siphon tubes for withdrawing the condensate collected at the bottom of each section and for reintroducing it in the intermediate point of the succeeding section.
6. Tube bundle exchanger, preferably horizontally arranged, one for each section, for preheating the sea water, the preheating means being the steam produced in each single stage.
7. Devices (tubes with valves) for transferring any inert gases present from one section to the succeeding one, as far as the vacuum station or directly to the vacuum station.
8. Tubes for sea water feed.
9. Tubes for brine discharge.
10. Tubes for fresh water discharge.
11. Tubes for the introduction of primary steam.
12. Tubes for the connection with the vacuum system.

The pressure in the sections decreases from the top to the bottom. The condensate collected on the bottom sheet of each section is conveyed to the successive stage.

In this way it is not necessary to have a perfect mechanical seal between one section and the succeeding one, the liquid head on the sheet being sufficient to assume the seal at the steam side, and having no effect of liquid seeping through the bearing sheet.

In an extreme case, the single evaporators could simply rest on the corresponding support ring, with remarkable simplification of construction and erection.

The sea water flows inside the exchangers without contacting the column, which therefore can be made of carbon steel.

The distribution of the salt water in the tubes of the film evaporators, occurs by means of proper distributor ferrules. A distributor ferrule 8A is shown in FIG. 5 in a partial cutaway view of the tube of the film evaporator 8.

For plants having moderate or great size it can be convenient to adopt at least 15 stages, arranged in two columns.

For cleaning the film evaporators without extracting them from the column, it will be necessary to provide a distance of about two meters between one evaporator and the succeeding one.

For plants of small size having not more than 10 - 12 stages, only one column can be enough and for maintenance it will be convenient to extract the exchangers from the column.

The invention will be better understood by reference to the accompanying drawing of FIG. 2 which is a diagrammatic elevation of my desalination apparatus, and is not to be considered restrictive of the invention itself. In the said figure with 1 is indicated the column, with 2 the inlet connections for the sea water preheated by means of the preheaters 3; with 4 are indicated the basins collecting the brine, with 6 the overflows, with 7 the vapor outlet holes, said holes being supplied with demisters, with 8 the evaporators with bundles of vertical tubes (only one tube has been indicated), with 9 the tubes bringing the condensate (distilled water) from one stage to the following one, with 10 the the brine discharge tube, with 11 the fresh water discharge tube, with 5 the primary steam inlet, with 12 the tubes for transferring any inert gases that may be present from one stage to the succeeding stage and so on to the vacuum station. With 13 the tube for the connection to the vacuum station is indicated.

The sea water, through the tubes 2, enters the first basin 4. From the overflow 6, it spreads on the tube sheet of the underlying evaporator 8 operating at lower pressure. FIG. 4 shows a section of a vertically arranged cylindrical section with float valve 6A. Said evaporator is heated from the outside with live steam introduced from 5. The live steam acts as the last preheater of the sea water in the exchanger 3.

Owing to the heating the sea water partly vaporizes inside the tubes of the evaporator and the so formed liquidvapor mixture flows to the basin of the underlying section, wherein the vapor separates from the liquid, going out through the special holes 7, supplied with demisters. The liquid, passing through the overflow of the basins 6, feeds the tubes of the succeeding evaporator operating at lower pressure and so on. On the contrary the vapor condenses outside the tube of the evaporators 8 and the condenser 3 placed in the same section of the column.

The operations follow one upon the other in the same order as far as the last section, wherein there being no more evaporators, the remaining liquid is discharged as brine all the vapor is condensed in a condenser 14 with sea water comprising also the feed, which is preheated.

Any inert gases which are present are discharged through the piping 13 connected to the vacuum system.

FIG. 3 is a cross section of the column. The numbers indicate the same parts that are indicated in FIG. 2.

It is obvious, from the above description, the desalination plant, which will be constituted only of one or two columns, according to the circumstances, has been remarkably simplified by our invention.

Obviously a remarkable cost reduction of the plant and therefore of the produced fresh water is a consequence of this simplification it is; from this that the great importance of the present invention is derived.

Moreover it is important to point out that the device which is the subject of the present invention has very limited overall dimension in comparison with the traditional systems wherein the evaporators are disposed horizontally.

Furthermore it is possible to prefabricate the separate sections, which are then simply assembled one upon the other in the field. This reduces remarkably the costs because the construction in an equipped workshop is much easier than the direct construction in the field.

What we claim is:

1. A multiple effect distillation apparatus for the desalination of sea water which comprises a column of a plurality of superposed cylindrical sections, each section comprising the following elements:
   a. two interior falling film evaporators, each with a bundle of vertical tubes, the bundle of each film evaporator having a cross section shaped as a segment of a circle, without external shell;
   b. two respective basins, the basins in the uppermost section being connected at their tops to their respective feed tubes for sea water, the respective basins in succeeding sections being connected at their respective upper tube sheets to the tubes associated with the basin in that section bundle which is immediately superjacent; all of said basins being connected at their bottoms to the respective upper tube sheet of the respective falling film evaporators of said same colinearly subjacent cylindrical section segmental bundle with the exception of those basins in the lowermost section which has its bottom connected to a brine discharge tube;
   c. a restriction placed at the bottom of each basin, having the purpose of permitting the passage of the brine from the basin to the underlying tube sheet by dissipating the positive pressure difference existing between the basin and said tube sheet;
   d. openings in the upper side of each basin except in the basins of the first section which allow vapor to flow from each of said basins about the tubes of the respective subjacent bundle, said openings having associated droplet removers or demisters returning captured droplets to their respective basins;
   e. one or more siphon tubes for withdrawing the condensate collected at the bottom of each section and for reintroducing said condensate at the intermediate point of the succeeding subjacent section;
   f. a horizontal tube bundle exchanger, for preheating the sea water, the preheating agent being the vapor produced in each single stage said preheating exchanger being centrally located between the pair of segmental film evaporators in each section;
   g. means for transferring any inert gases from each section to the succeeding subjacent section; said lowermost section having connecting means to a vacuum system to collect said inert gases;
   h. said vertically superposed sections each having a head of condensed liquid on its bottom except the lowermost section, for preventing free passage of vapor between said sections;
   i. said apparatus having inlet tubes for the introduction of sea water to the basins of said uppermost section and inlet tubes for the introduction of steam to the exterior surfaces of the tube bundles of said uppermost section; and
   j. an outlet tube at said lowermost section for removing condensate.

2. An apparatus according to claim 1 wherein the means for transferring any inert gases for each vertically arranged section to the succeeding section are tubes provided with valves.

3. An apparatus according to claim 1 wherein the restriction placed at the bottom of each basin is a submerged orifice.

4. An apparatus according to claim 1 wherein the restriction at the bottom of each basin is a float valve.

* * * * *

UNITED STATES PATENT AND TRADEMARK OFFICE
CERTIFICATE OF CORRECTION

PATENT NO. : 3,961,658
DATED : June 8, 1976
INVENTOR(S) : Giorgio Pagani

It is certified that error appears in the above-identified patent and that said Letters Patent are hereby corrected as shown below:

Col. 2, line 36  "1:5" should be --1.5--

"7:5" Should be --7.5--

Col. 2, line 38  "flat" should be --flow--

Col. 4, line 21  Cancel one "the"

Signed and Sealed this twenty-third Day of August 1977

[SEAL]

Attest:

RUTH C. MASON
*Attesting Officer*

C. MARSHALL DANN
*Commissioner of Patents and Trademarks*